Dec. 25, 1951 K. S. LAURIE 2,580,233
SYNCHRONIZED STENTER DRIVE
Filed March 10, 1947 2 SHEETS—SHEET 1

Inventors
KENNETH SOMERVILLE LAURIE
By
THEIR Attorney

Dec. 25, 1951 K. S. LAURIE 2,580,233
SYNCHRONIZED STENTER DRIVE
Filed March 10, 1947 2 SHEETS—SHEET 2
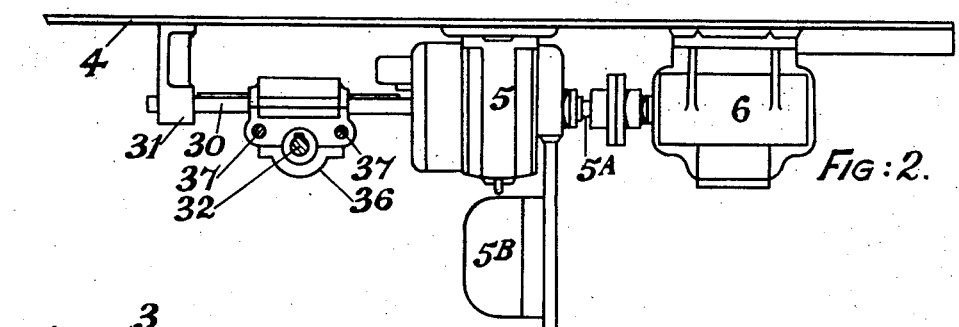
FIG: 2.
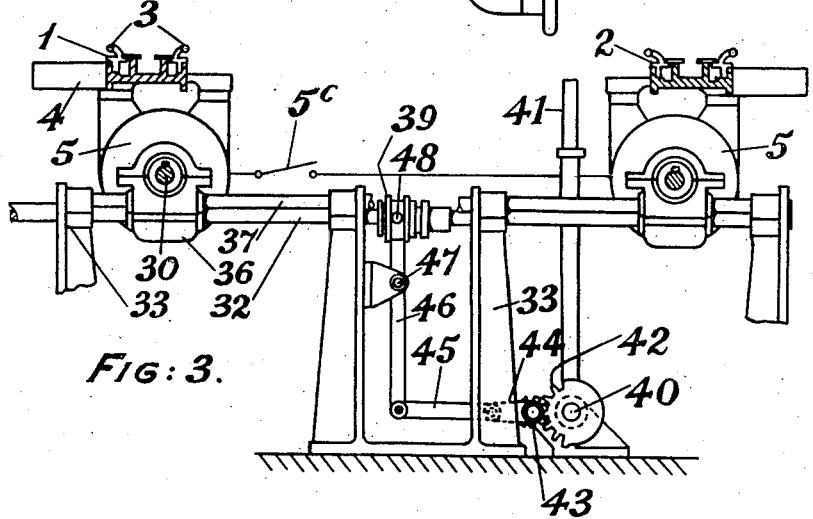
FIG: 3.
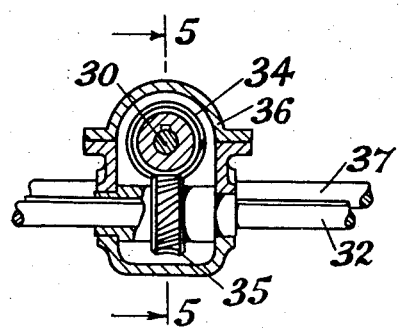
FIG: 4.
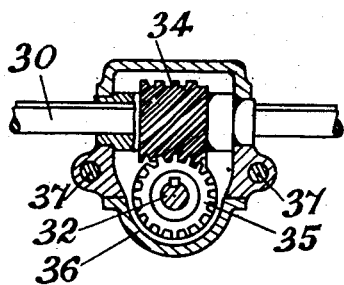
FIG: 5.
Inventors
KENNETH SOMERVILLE LAURIE
By Otto Munk
THEIR Attorney Patented Dec. 25, 1951

2,580,233

UNITED STATES PATENT OFFICE 2,580,233

SYNCHRONIZED STENTER DRIVE

Kenneth Somerville Laurie, Glasgow, Scotland, assignor to John Dalglish, Glasgow, Scotland Application March 10, 1947, Serial No. 733,568
In Great Britain December 5, 1944

Section 1, Public Law 690, August 8, 1946
Patent expires December 5, 1964

7 Claims. (Cl. 26—57)

This invention relates to stentering or like machines (hereinafter referred to as "stenters").

Two individual motor drives for stenters of the straight top-return type have been proposed in order to avoid the complicated and costly mechanical drive necessary to transmit the required motion to both stenter chains from a single driving motor, and it has been proposed to maintain the necessary synchronism between the two drives by using induction motors and by electrically interconnecting their rotors and using additional electrical contrivances. It is however a difficult problem to drive the motors of both chains in absolute synchronism at all times, including the times of starting and stopping.

The present invention comprises a stenter in which the stenter chains are driven by individual driving means, one for each chain, said driving means being designed so that with increase of drag torque the speed reduces, and vice versa, and in which a mechanical synchronising connection is provided between the two driving means, the arrangement being such that if either driving means tends to vary in speed in relation to the other a correcting torque is applied by the mechanical interconnection.

Preferably the driving means take the form of drooping characteristic electric motors; that is to say motors in which with increase in drag torque the speed decreases, and vice versa. Such a characteristic is usually known as "series characteristic." A D. C. series wound motor is an example of a motor having such a characteristic.

If in the driving of the stenter chains one motor tends to increase in speed, the mechanical interconnection applies a negative torque or drag thereto from the second motor, increasing the torque of the first motor and overcoming its tendency to increase speed. Simultaneously, the second motor has a positive torque or drive applied thereto, reducing its drag torque and tending to increase its speed. Thus close regulation results and synchronism between the stenter chains is maintained.

The invention also comprises a stenter in which the stenter chains are driven by individual electric motors having a drooping characteristic and in which a mechanical connection between said motors comprises a synchronising shaft that is geared to rotary shafts driven by the respective motors and is adapted to transmit speed-correcting torque from either motor to the other.

The invention is applicable to stenters which have so-called "jigging" mechanism, that is to say, mechanism by which there is imparted to the stenter chains, in addition to their ordinary travel, a to-and-fro motion substantially lengthwise of the cloth, the chains being moved in mutually opposite directions.

The invention also comprises a stenter having its stenter chains supported by side rails adapted to receive longitudinal jigging motion from jigging mechanism, in which said chains are driven by individual electric motors supported by and movable in unison with the respective side rails and in which a synchronising shaft constituting a mechanical connection between the motors is journalled in a stationary location being geared at opposite sides of the stenter to the respective motors and the gearing being such that said motors move freely in relation to the synchronising shaft during the jigging motion.

The invention is also applicable to stenters having mechanism for adjusting the widthwise space between the stenter chains to suit the width of the cloth to be stentered. That is to say, the mechanical inter-connection is arranged to maintain its relationship with the individual drives throughout the range of widthwise adjustment.

The stenter may have left straightening means consisting of a clutch in the mechanical inter-connection for disconnecting one drive from the other to permit speeding-up or slowing down of one drive in relation to the other.

The invention will now be described by way of example with reference to the accompanying drawings, which are more or less diagrammatic in the interests of clearness of illustration. In the drawings:

Fig. 2 is a section on the line 2—2 of Fig. 1.

Fig. 3 is a section on the line 3—3 of Fig. 1.

Fig. 4 is a section to a larger scale on the line 4—4 of Fig. 1, and Fig. 5 is a section to the same scale on the line 5—5 of Fig. 4.

Figure 1:
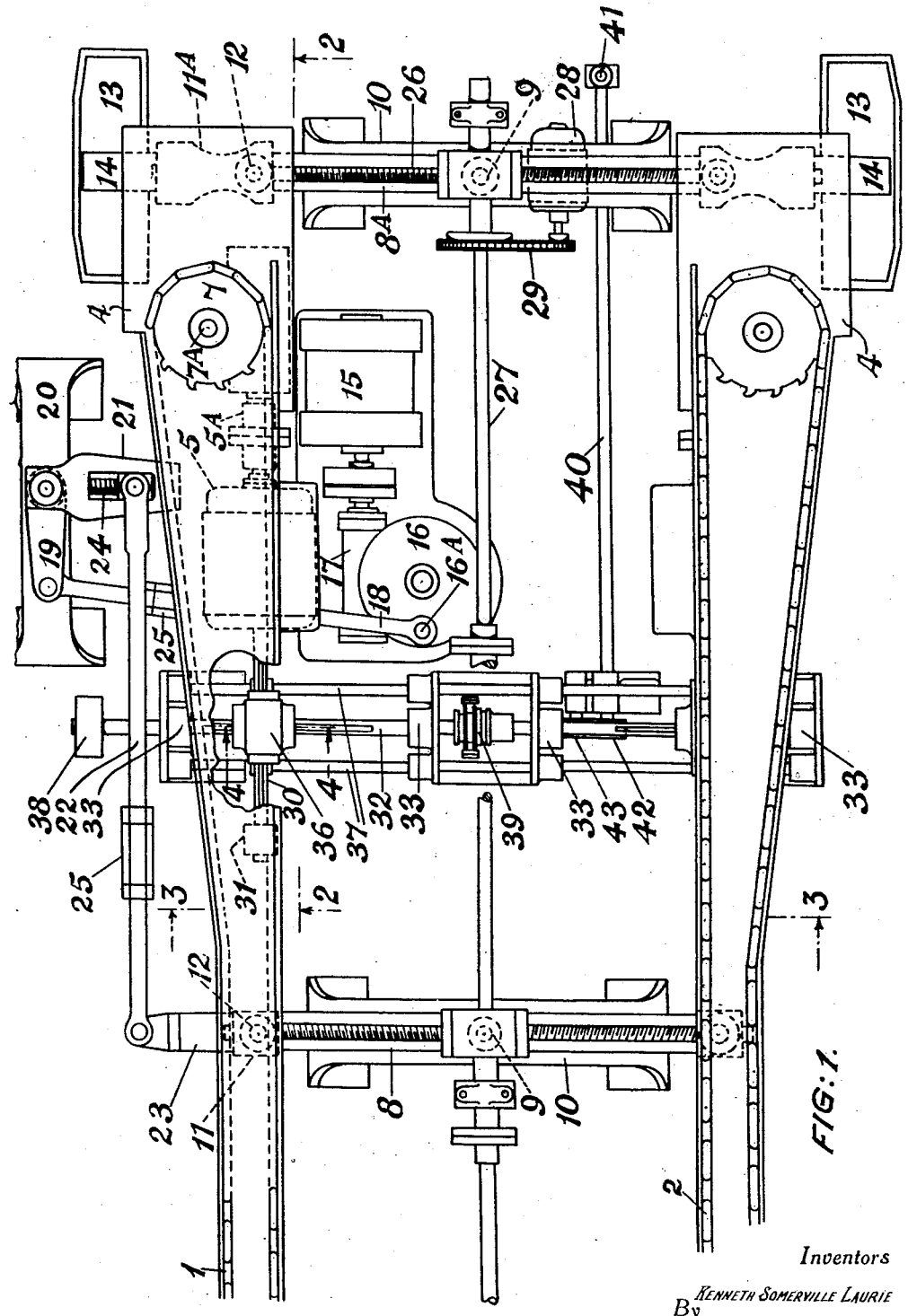
Fig. 1 is a plan of the driving end of a stenter having "jigging" mechanism and mechanism for adjusting the widthwise relationship between the stenter chains, breaks in certain parts being shown.

Referring chiefly to Fig. 1, the two chains of the stenter are symbolically represented, being denoted 1 and 2. Each of these chains is provided with cloth grippers (conventionally shown in Fig. 3 and denoted there by 3). Each chain is supported by one of two side rails 4, which extend throughout the length of the stenter. Each chain is driven by one of two electric motors 5 through worm gearing, in a casing 6 (Fig. 2), and a sprocket wheel 7. The worm gearing includes a worm secured to the motor shaft 5A, the sprocket wheel 7 being secured to a vertical worm wheel shaft 7A. Each motor 5 has a cooling fan 5B (Fig. 2).

Jigging motion is applied to the side rails 4 through a series of intermediate cross rails 8 and end cross rails 8A, each of which is pivotally connected at 9 to one of a series of supports 10. Each of the cross rails 8 and 8A have at their ends swivel boxes 11 and 11A respectively which are pivotally connected at 12 to the side rails 4. The side rails, at their ends, are supported by stationary tables 13, upon which bear extensions 14 of the end cross rails 8A. In the example, a variable speed electric motor 15 is provided to drive the jigging mechanism. This motor drives a crank disc 16 through worm gearing in a casing 17. The crank 16A is connected by a rod 18 to one arm 19 of a bellcrank lever which is fulcrumed on a support 20. The other arm 21 of the bellcrank lever is connected by a link 22 to an extension 23 of one of the cross rails 8. The arm 21 has provision whereby the stroke imparted by it can be adjusted, the adjustment means being illustrated as a nut-and-screw connection 24. Turnbuckles 25 are incorporated in the rod 18 and link 22 for adjustment of the lengths of these parts in the erection of the machine. In operation of the jigging mechanism, the side rails are forced to swing longitudinally in mutually opposite directions, in this way constraining the active rows of cloth grippers to impart the requisite "jigging" action to the cloth.

The mechanism for adjusting the widthwise relationship between the stenter chains includes a series of cross screws 26 associated with the cross rails 8 and 8A. Each of these screws has right hand threads and left hand threads, the respective threads of each screw engaging with nuts incorporated in the swivel boxes 11 of the opposite side rails. The cross screws 26 are connected through worm gearing to a single longitudinal shaft 27 which in the example is driven by a reversible electric motor 28 through a drive 29. By driving the motor in the appropriate direction and to the appropriate extent the side rails can be adjusted a determinate extent away from one another or towards one another to suit the cloth width.

The jigging mechanism and widthwise adjustment mechanism described are known per se as applied to stenters and may take any of various forms.

In the example the two electric motors 5 which drive the stenter chains are identical, being of any suitable type, A. C. or D. C., and they are capable of speed variation over a range of say 5 to 1, or even more, and they have to some extent a drooping characteristic. These motors are mounted respectively on the underside of the side rails 4 (as Figs. 2 and 3 show) and the worm-gear cases 6 are also mounted on the under side of said side rails. Thus each motor and its drive to the associated stenter chain 1 or 2 are wholly supported by the associated side rail and therefore move with the rail as a part thereof during the jigging motion and during widthwise adjustment by the mechanisms already described; and there is no variation in speed of the stenter chains over the side rails as a result of the jigging motion.

With the exception of a special speed changer, the two driving motors 5 are connected as one motor to the same set of control gears including a starting switch 5c and speed varying means (not shown), so that on starting both motors start and accelerate simultaneously and so that on stopping they come to rest simultaneously, synchronism between them thus being capable of maintenance throughout the entire period of operation. The special speed changer is incorporated in the control system of one of the two motors, say the right hand motor as viewed in Fig. 3. The function of this speed changer will be described hereinafter.

In order to obtain and maintain synchronism between the two driving motors 5, a mechanical connection between them is provided. The mechanical connection includes an extension 30 of each motor shaft, the extension being journalled at its end in a bearing bracket 31 on the underside of the associated side rail 4. The mechanical connection also includes a synchronising shaft 32, namely a cross shaft journalled in a stationary location in bearings 33. That is to say, the cross shaft 32 is arranged to take no part whatsoever in the jigging motion of the side rails or in the movement thereof necessary for widthwise adjustment. The cross shaft 32 is connected to each of the two extension shafts 30 by any appropriate gearing; in the example, worm gearing is provided. As Figs. 4 and 5 show, each extension shaft 30 has a worm 34 which meshes with a wormwheel 35 on the cross shaft 32 the axes of the intermeshing gears 34 and 35 being mutually crosswise. Each pair of gears 34, 35 is mounted within a casing 36, which is supported independently of the shafts 30, 32 by stationary cross rods 37 extending alongside the cross shaft. Each worm and wormwheel, although held to its shaft so as to rotate therewith, is in freely sliding relationship with its shaft. By way of illustration, the drawing shows each shaft 30 and 32 provided with a feather and each worm 34 and wormwheel 35 formed with a longitudinal groove, each feather being slidable in relation to the groove of the associated gear. The arrangement therefore is such that each driving motor 5 serves to rotate the cross shaft 32, and the rotary connection is maintained without interference from the jigging mechanism or from the widthwise adjustment mechanism. Each casing 36 together with the gears 34, 35 within it is in sliding relationship with the respective shafts. That is to say, during the operation of the stenter, in the jigging motion of the side rails, the extension shafts 30 slide longitudinally through the gear casings 36 and worms 34 therein; and during widthwise adjustment of the side rails 4, the gear casings 36 and wormwheels 35 therein slide freely along the cross shaft 32 and cross rods 37. In this way, a positive mechanical tie between the two motors 5 is provided. Accordingly, if in the driving of the stenter chains the speed of one motor tends to increase, the mechanical interconnection 30, 32, 30 applies to that motor a drag which tends to prevent the increase; and simultaneously the inter-connection tends to apply an extra drive to the other motor, so that its torque tends to decrease with the result that its speed tends to increase. The result of these opposing tendencies is that synchronism between the two motors is maintained.

The cross shaft 32 can be utilised to drive small auxiliaries, such as folders, and for such a purpose in the example the cross shaft is provided with a pulley 38. If desired, the interconnection 30, 32, 30 may be made strong enough for the cross shaft to operate the jigging mechanism and/or the widthwise adjustment mechanism (that is to say the motor 15 and/or the motor 20 may be dispensed with).

If desired, the mechanical inter-connection 30, 32, 30 especially where no drive to auxiliary mechanism is provided, may be made very light in comparison with the size of a shaft designed to transmit the drive to a stenter chain, seeing that the work of the inter-connection would simply be to apply a correcting torque. Moreover, by designing the gearing between the motor extension shafts 30 and the cross shaft 32 to run the cross shaft at the highest convenient speed, the torque and the size of the shaft can be proportionately reduced.

In stenters it is desirable to have provision for weft straightening, that is means whereby one chain can be slowed-down or speeded-up temporarily in relation to the other motor in the event that one side of the cloth may be ahead of or lagging behind the other side. Therefore the previously mentioned speed changer is provided. The speed changer is operated by a device which when manipulated to slow-down or speed-up the right hand motor first of all opens a clutch 39 in the cross shaft. In the example, the speed changer is operated by a shaft 40 (by any appropriate operative connection therewith) and the shaft has a hand lever 41 for turning it in either direction according to whether the right hand motor is to be slowed-down or speeded-up. The shaft 40 has a toothed quadrant 42 which meshes with a pinion 43 having an arm 44. A link 45 couples the arm 44 to a clutch lever 46 with a stationary fulcrum 47, the lever having a fork 48 that engages the movable component of the clutch 39. If the hand lever 41 is turned in either direction, the arm 44 pulls the clutch into its disengaged position, the action being timed to occur before the speed changer comes into action. Thus, whenever the speed changer is operated, the driving motors 5 are already disconnected from one another so that each is free from the synchronising action of the other and the right hand motor can be slowed-down or speeded-up as required.

I claim:

1. A stenter comprising a pair of stenter chains, a pair of guide rails carrying the chains, individual electric motors mounted one on each guide rail and in driving connection with the chains and operable simultaneously to drive the chains, jigging mechanism adapted to move the guide rails to cause longitudinal jigging of the chains, and a mechanical synchronising connection between the two motors adapted to apply a correcting torque if either motor tends to vary in speed in relation to the other motor.

2. A stenter as claimed in claim 1 in which the mechanical synchronising connection between the two motors is mounted in a stationary location and is adapted to maintain its operative relationship with the motor drives throughout the jigging motion.

3. A stenter comprising a pair of stenter chains, a pair of guide rails carrying the chains, individual electric motors mounted one on each guide rail and in driving connection with the chains and operable simultaneously to drive the chains, jigging mechanism adapted to move the guide rails to cause longitudinal jigging of the chains, mechanism for adjusting the widthwise relationship between the chains to suit the cloth width and a mechanical synchronising connection between the two motors adapted to apply a correcting torque if either motor tends to vary in speed in relation to the other motor.

4. A stenter comprising a pair of stenter chains, a pair of guide rails carrying the chains, individual electric motors mounted one on each guide rail and in driving connection with the chains and operable simultaneously to drive the chains, jigging mechanism adapted to move the guide rails to cause longitudinal jigging of the chains, mechanism for adjusting the widthwise relationship between the chains to suit the cloth width and a mechanical synchronising connection between the two motors adapted to apply a correcting torque if either motor tends to vary in speed in relation to the other motor, said connection between the two motors being mounted in a stationary location and being adapted to maintain its relationship with the individual motor drives during the jigging motion and throughout the range of widthwise adjustment.

5. A stenter as claimed by claim 4 having jigging mechanism and widthwise adjustment mechanism, in which the mechanical synchronizing connection comprises a synchronising shaft geared to shafts incorporated in or driven by the individual chain drives and in which the gearing between each of said driven shafts and the synchronising shaft comprises intermeshing gearwheels with their axes mutually crosswise and within a casing which together with said gearwheels is in sliding relationship with the respective shafts.

6. A stenter as claimed by claim 5 having means for weft straightening, in which said means consists of a clutch in the mechanical synchronizing connection for disconnecting one drive from the other to permit speeding-up or slowing-down of one drive in relation to the other.

7. A stenter as claimed by claim 6 having weft straightening means consisting of a clutch in the synchronising shaft for disconnecting the individual motors from one another and a device for operating said clutch in timed relationship with means for slowing-down or speeding-up one of the motors.

KENNETH SOMERVILLE LAURIE.

REFERENCES CITED

The following references are of record in the file of this patent:

UNITED STATES PATENTS

| Number | Name | Date |
|---|---|---|
| 640,229 | Rusden | Jan. 2, 1900 |
| 647,240 | Sprague | Apr. 10, 1900 |
| 746,887 | Smith | Dec. 15, 1903 |
| 1,746,473 | Hoey | Feb. 11, 1930 |
| 1,754,089 | France | Apr. 8, 1930 |
| 1,754,099 | Hamilton | Apr. 8, 1930 |
| 1,791,498 | Halliburton et al. | Feb. 10, 1931 |
| 2,106,612 | La Pierre et al. | Jan. 25, 1938 |
| 2,209,220 | Berry | July 23, 1940 |
| 2,219,213 | Swain | Oct. 22, 1940 |
| 2,311,406 | Mansfield et al. | Feb. 16, 1943 |

FOREIGN PATENTS

| Number | Country | Date |
|---|---|---|
| 517,996 | Great Britain | Feb. 14, 1940 |
| 568,965 | Great Britain | Apr. 27, 1945 |